Patented June 19, 1934

1,963,471

UNITED STATES PATENT OFFICE

1,963,471

NICOTINE SALTS OF 2.4-DINITROPHENOL AND SUBSTITUTED DERIVATIVES THEREOF

Lindley E. Mills, Midland, Mich., assignor to The Dow Chemical Company, Midland, Mich., a corporation of Michigan No Drawing. Application June 10, 1932, Serial No. 616,497

5 Claims. (Cl. 260—25)

The present invention regards a new class of compounds, namely, the nicotine salts of 2.4-dinitrophenol, or derivatives thereof being further substituted in the 6 position.

I have prepared several of the aforementioned salts, determined certain physical properties thereof whereby they may be readily identified, and have found that they may advantageously be used in the control of insects of the order Hemiptera, particularly those of the family Aphidiidae. To the accomplishment of the foregoing and related ends, the invention, then, consists of the new products, together with the method of preparing the same, hereinafter fully described and particularly pointed out in the claims, the following description setting forth in detail several of the various ways in which the principle of the invention may be realized.

I have found that the nicotine salts of the 2.4-dinitrophenols may conveniently be prepared by reacting together equimolecular quantities of nicotine and a 2.4-dinitrophenol, either with or without the presence of a solvent such as ethyl alcohol, benzene, or toluene. The reaction mixture is preferably to be heated to a temperature between about 40° and 100° C. and the solution agitated during the reaction period. The reaction mixture is then allowed to cool to room temperature, during which cooling the salt crystallizes from the solution and may be readily separated from the mother liquor.

The 2.4-dinitrophenols included within the scope of my invention have the following general structural formula, wherein the symbol "X" represents hydrogen, a halogen, an alkyl, aryl, or alicyclic radical:—

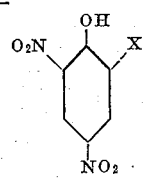

The probable structural formula of the nicotine salts of the foregoing dinitrophenols is:—

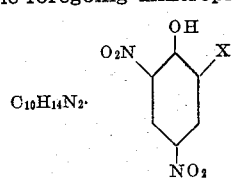

The salts are pale yellow, or brownish-yellow crystalline substances which melt over a varying range depending upon the character of the symbol "X" in the foregoing structural formula. In general, they are slightly soluble in cold water, and somewhat more soluble in hot water. Analysis of the various salts for per cent nitrogen shows substantially the theoretical amount of nitrogen to be present therein.

The following examples show in detail the method used in preparing several specific members of my new class of compounds, and describe some of the properties of the individual salts.

Example 1.—Nicotine 2.4-dinitrophenolate

In the preparation of this compound 8.1 grams (.05 mol) of nicotine was added to 9.2 grams (.05 mol) of 2.4-dinitrophenol. The reaction mixture was stirred and warmed for a few minutes in order to allow the reaction to go to completion. The salt was then crystallized from a mixture of equal parts of benzene and toluene. A substantially theoretical yield of nicotine 2.4-dinitrophenolate was obtained in the form of small brownish-yellow crystals melting at 131°–132° C. The salt is quite soluble in alcohol and considerably more soluble in water than the nicotine salts of the substituted dinitrophenols.

Example 2.—Nicotine 2.4-dinitro-6-chlorophenolate

This compound was prepared by heating together a mixture of 10.9 grams (.05 mol) of 2.4-dinitro-6-chlorophenol and 8.1 grams (.05 mol) of nicotine at a temperature of about 80° C., in toluene as a solvent. The reaction mixture was then allowed to cool, and the yield of nicotine 2.4-dinitro-6-chlorophenolate crystals obtained was 17 grams or 85 per cent of theoretical. The crystals, having a melting point of 119° C., were light yellow in color, slightly more soluble in cold alcohol than in hot alcohol, and sparingly soluble in hot and cold water.

Example 3.—Nicotine 2.4-dinitro-6-methyl phenolate

In the preparation of this compound 9.9 grams (.05 mol) of 2.4-dinitro-6-methyl phenol was dissolved in 40 milliliters of ethyl alcohol maintained at a temperature of about 78° C. To this solution was added 8.1 grams (.05 mol) of nicotine, meanwhile agitating the reaction mixture, which was heated for a few minutes after the addition of the nicotine in order to insure complete reaction. The reaction mixture was then cooled to about 15° C., and the crystals of nicotine 2.4-dinitro-6-methyl phenolate which had been precipitated from the mother liquor were separated therefrom by filtration. The yield of yellow, prism-like, powdery crystals was 18 grams, equivalent to the theoretical yield, having a melting point of about 122° C. The salt is soluble in hot water and moderately soluble in cold water.

*Example 4.—Nicotine 2.4-dinitro-6-phenylphenolate*

91 grams (.35 mol) 2.4-dinitro-6-phenylphenol was dissolved in 1,000 milliliters of boiling alcohol, and 56.7 grams (.35 mol) nicotine added. The yield of pale yellow crystals was 138 grams or 94 per cent of theoretical. The melting point was determined to be 170.2° C. The salt is slightly soluble in cold water with increasing solubility in hot water. Analysis of the compound for percentage of nitrogen showed, by the Dumas method for total nitrogen, 13.64 per cent as against a calculated percentage of 13.29; and by the TiCl₃ method for nitro nitrogen, 6.25 per cent as against a calculated percentage of 6.65.

*Example 5.—Nicotine 2.4-dinitro-6-cyclohexyl phenolate*

13.3 grams (.05 mol) 2.4-dinitro-6-cyclohexyl phenol was dissolved in 80 milliliters of boiling ethyl alcohol, and 8.1 grams (.05 mol) of nicotine added. The yield of nicotine 2.4-dinitro-6-cyclohexyl phenolate was 19 grams or 89 per cent of theoretical. The yellow-orange, needle-like crystals obtained had a melting point of 151.5° C. The compound is slightly soluble in cold water, the solubility increasing with the temperature of the water.

A series of tests were conducted to determine the value of my new compounds in the control of insects, particularly aphids. The results showed that concentrations of the various salts as low as .005 per cent by weight of aqueous solution produced excellent killing results, and that in general, the use of aqueous solutions having a concentration of the salts between about .02 and .005 per cent by weight may be advantageously employed in the destruction of aphids.

Other modes of applying the principle of my invention may be employed instead of the one explained, change being made as regards the method and products herein disclosed, provided the step or steps stated by any of the following claims or the equivalent of such stated step or steps be employed.

I therefore particularly point out and distinctly claim as my invention:—

1. As a new product, a compound having the structural formula:—

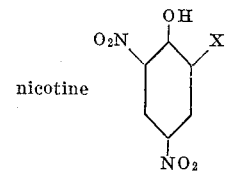

wherein X represents hydrogen, a halogen, an alkyl, aryl, or alicyclic radical.

2. As a new compound, nicotine 2.4-dinitro-6-methyl-phenolate.

3. As a new compound, nicotine 2.4-dinitro-6-phenyl-phenolate.

4. As a new compound, nicotine 2.4-dinitro-6-cyclohexyl-phenolate.

5. A method for preparing the nicotine salt of 2.4-dinitrophenol which comprises reacting a 2.4-dinitrophenol having the following structural formula:—

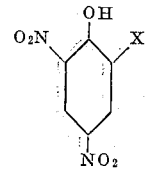

wherein X represents hydrogen, a halogen, an alkyl, aryl, or alicyclic radical, with nicotine at a temperature between about 40° C., and about 100° C.

LINDLEY E. MILLS.